US011136137B2

United States Patent
Escobar et al.

(10) Patent No.: US 11,136,137 B2
(45) Date of Patent: Oct. 5, 2021

(54) NON-INTRUSIVE PASSENGER REST CABIN MONITORING SYSTEM

(71) Applicant: Rockwell Collins, Inc., Cedar Rapids, IA (US)

(72) Inventors: Art M. Escobar, Seattle, WA (US); Nicolas Behr, Kirkland, WA (US); Trevor Skelly, Mercer Island, WA (US); Randall S. Weaver, Bremerton, WA (US); R. Klaus Brauer, Seattle, WA (US); Patrice About, Gournay sur Marne (FR)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/126,981

(22) Filed: Sep. 10, 2018

(65) Prior Publication Data
US 2020/0079524 A1 Mar. 12, 2020

Related U.S. Application Data

(60) Provisional application No. 62/729,237, filed on Sep. 10, 2018.

(51) Int. Cl.
*B64D 45/00* (2006.01)
*G08B 17/06* (2006.01)
(Continued)

(52) U.S. Cl.
CPC ............. *B64D 45/00* (2013.01); *G08B 7/062* (2013.01); *G08B 17/06* (2013.01);
(Continued)

(58) Field of Classification Search
CPC ... B64D 45/00; B64D 2045/003; G08B 17/06
See application file for complete search history.

(56) References Cited

U.S. PATENT DOCUMENTS 3,144,224 A 8/1964 Carroll
5,651,733 A 7/1997 Schumacher
(Continued)

FOREIGN PATENT DOCUMENTS

WO 2019207211 A1 10/2019

OTHER PUBLICATIONS

Flynn, David, Dec. 27, 2013, https://www.ausbt.com.au/the-best-seats-on-a-cathay-pacific-boeing-777-300er-try-the-upstairs-bunk-beds, 1 page.
(Continued)

*Primary Examiner* — Curtis B Odom
(74) *Attorney, Agent, or Firm* — Suiter Swantz pc llo

(57) ABSTRACT

A passenger cabin monitoring system includes infrared cameras disposed in respective passenger rest compartments, a flight attendant information system including at least one display and at least one speaker, and a computing device in communication with the infrared cameras and the flight attendant information system. The computing device is configured to detect a temperature of a portion of passenger rest compartment based on one or more thermal images generated by a respective infrared camera of the passenger rest compartment. The computing device is further configured to compare the temperature of the portion of the passenger rest compartment with a predetermined critical temperature and provide an audible alert and/or a visual alert via the flight attendant information system to indicate a critical status of the passenger rest compartment when the temperature of the portion of the passenger rest compartment is above the predetermined critical temperature.

18 Claims, 10 Drawing Sheets

(51) Int. Cl.
   *G08B 7/06*    (2006.01)
   *B64D 11/00*   (2006.01)
(52) U.S. Cl.
   CPC .............. *B64D 2011/0084* (2013.01); *B64D 2045/007* (2013.01); *B64D 2045/009* (2013.01)

(56) References Cited

U.S. PATENT DOCUMENTS

| | | | |
|---|---|---|---|
| 5,784,836 | A | 7/1998 | Ehrick |
| 6,003,813 | A | 12/1999 | Wentland et al. |
| 6,073,883 | A | 6/2000 | Ohlmann et al. |
| 6,152,400 | A | 11/2000 | Sankrithi et al. |
| 6,182,926 | B1 | 2/2001 | Moore |
| 6,305,645 | B1 | 10/2001 | Moore |
| 6,393,343 | B1 | 5/2002 | Frey et al. |
| 6,464,169 | B1 | 10/2002 | Johnson et al. |
| 6,520,451 | B1 | 2/2003 | Moore |
| 6,616,098 | B2 | 9/2003 | Mills |
| 6,659,225 | B2 | 12/2003 | Olliges et al. |
| 6,672,541 | B2 | 1/2004 | Fieldson et al. |
| 6,772,977 | B2 | 8/2004 | Dees et al. |
| 6,808,142 | B2 | 10/2004 | Oki |
| 6,848,654 | B1 | 2/2005 | Mills et al. |
| 6,932,298 | B1 | 8/2005 | Mills |
| 6,972,694 | B2 | 12/2005 | Carroll |
| 7,088,310 | B2 | 8/2006 | Sanford |
| 7,290,735 | B2 | 11/2007 | Saint-Jalmes et al. |
| 7,355,508 | B2 | 4/2008 | Mian et al. |
| 7,389,959 | B2 | 6/2008 | Mills |
| 7,762,496 | B2 | 7/2010 | Seiersen et al. |
| 7,792,189 | B2 | 9/2010 | Finizio et al. |
| 7,823,831 | B2 | 11/2010 | Guering |
| 7,878,586 | B2 | 2/2011 | Kneller et al. |
| 7,942,367 | B2 | 5/2011 | Saint-Jalmes et al. |
| 8,152,102 | B2 | 4/2012 | Warner et al. |
| 8,162,258 | B2 | 4/2012 | Joannis et al. |
| 8,328,137 | B2 | 12/2012 | Sutthoff et al. |
| 8,534,602 | B2 | 9/2013 | Jakubec et al. |
| 8,602,354 | B2 | 12/2013 | Sutthoff et al. |
| 8,794,569 | B1 | 8/2014 | Ohlmann et al. |
| 8,844,865 | B2 | 9/2014 | Gehm et al. |
| 8,991,756 | B2 | 3/2015 | Papke |
| 9,340,294 | B1 | 5/2016 | Keleher et al. |
| 9,403,465 | B2 | 8/2016 | Kircher et al. |
| 9,456,184 | B2 | 9/2016 | Barrou et al. |
| 9,517,679 | B2 | 12/2016 | Frank et al. |
| 9,545,998 | B2 | 1/2017 | Lin |
| 9,550,571 | B1 | 1/2017 | Ohlmann et al. |
| 9,640,000 | B2 | 5/2017 | Koch et al. |
| 9,706,242 | B2 | 7/2017 | Dame et al. |
| 9,708,065 | B2 | 7/2017 | Sankrithi et al. |
| 10,043,363 | B2 | 8/2018 | Riedel |
| 2010/0140402 | A1 | 6/2010 | Jakubec et al. |
| 2011/0139930 | A1 | 6/2011 | Sutthoff et al. |
| 2015/0048205 | A1 | 2/2015 | Seibt et al. |
| 2017/0057637 | A1 | 3/2017 | Cole |
| 2017/0094166 | A1 | 3/2017 | Riedel |
| 2017/0094167 | A1 | 3/2017 | Riedel |
| 2017/0137109 | A1 | 5/2017 | Sieben |
| 2017/0233058 | A1 | 8/2017 | Brunaux et al. |
| 2017/0316664 | A1 | 11/2017 | Gerard |
| 2018/0130322 | A1 | 5/2018 | Price et al. |
| 2018/0265201 | A1 | 9/2018 | Carlioz et al. |

OTHER PUBLICATIONS

Bahrami, Ali, Federal Register, vol. 68, No. 74, Apr. 17, 2003, Rules and Regulations, "Overhead Crew Rest Compartments", pp. 18843-18852.
Bahrami, Ali, Federal Register, vol. 77, No. 62, Mar. 30, 2012, Proposed Rules, "Crew Rest Compartments", pp. 19148-19153.
U.S. Department of Transportation Federal Aviation Administration, Advisory Circular, "Flightcrew Member Rest Facilities", Sep. 19, 2012, AFS-220, AC 117-1 9 pages.
Meyer, David, "Airbus Has a Solution to 17-Hour Flight Hell: Beds in the Cargo Hold", Fortune, Apr. 11, 2018, 2 pages, http://fortune.com/2018/04/11/airbus-zodiac-sleep-cargo-hold/.
Ong, Thuy, "Emirates' new first class suites feature virtual windows and a 'zero-gravity' seat", The Verge, Dec. 1, 2017, 3 pages, https://www.theverge.com/2017/12/1/16723152/emirates-first-class-suites-virtual-windows-zero-gravity-seat.
International Search Report and Written Opinion dated Dec. 18, 2019 for PCT/US2019/050351.

NON-INTRUSIVE PASSENGER REST CABIN MONITORING SYSTEM

CROSS-REFERENCE TO RELATED APPLICATIONS

This application claims the benefit under 35 U.S.C. §§ 119 and/or 120 of:
(1) U.S. Provisional Patent Application Ser. No. 62/729,237, filed Sep. 10, 2018;
(2) U.S. patent application Ser. No. 16/127,035, filed Sep. 10, 2018;
(3) U.S. patent application Ser. No. 16/126,952, filed Sep. 10, 2018;
(4) U.S. patent application Ser. No. 16/127,074, filed Sep. 10, 2018;
(5) U.S. patent application Ser. No. 16/127,088, filed Sep. 10, 2018;
(6) U.S. patent application Ser. No. 16/127,119, filed Sep. 10, 2018; and
(7) U.S. patent application Ser. No. 16/127,109, filed Sep. 10, 2018.

The contents of each of the above-listed patent applications listed are incorporated herein by reference in their entirety.

BACKGROUND

Passenger aircraft have incorporated onboard crew rest compartments (CRC) for the short-term use of their pilots or crew. CRCs may include lounge chairs or, more commonly, bunks allowing cabin crew to rest in a lie-flat position when not on duty (e.g., on transoceanic or other long-haul flights requiring multiple shifts). However, CRCs are low-capacity, generally providing no more than six to eight bunks at most. Further, CRCs are generally inaccessible to passengers for security reasons, and may be directly accessible from the cockpit only.

Airlines may wish to provide their economy-class passengers, e.g., those passengers occupying seats in the main cabin as opposed to premium lie-flat convertible seats or enclosed compartments such as partitioned seats or suites, with access to bunk facilities comparable to those provided by a CRC for use on similar long-haul flights. Clearly such compartments must meet regulatory requirements for passenger use (e.g., similarly to CRCs, passenger rest compartments may not be used during taxi, takeoff and landing (TTL) flight segments). As an additional challenge, however, airlines must make passenger rest facilities easily accessible to participating passengers from the main cabin (e.g., when the aircraft has reached a safe cruising altitude and passengers are permitted to enter the rest compartments) while minimizing added weight as well as minimizing disruption to the interior space and passenger seating within the main cabin displaced by said means of access.

The incorporation of rest cabins for pilots and crew of an aircraft, and occasionally for passengers as well, includes a variety of approaches. For example, U.S. Pat. No. 5,784,836 discloses a removable sleeping compartment assembly that may nest together several different modules incorporating sleeping berths, restroom facilities, and other convenience features. The modules may have an exterior configuration or form factor similar to that of a cargo container. Entry to the sleeping compartments may be achieved by a pivotable staircase or lift system from the main deck. Additionally, U.S. Pat. Nos. 6,182,926; 6,305,645; and 6,520,451 disclose a variety of configurations for a crew rest station contoured to occupy the overhead space between the curved top hull of the aircraft and the lowered ceiling and providing bunk portions, lavatory facilities, and storage space. The crew rest station may be located in the approximate midsection of the aircraft and accessible via an entry ladder, with forward, aft, or side bunk facilities arranged around a central deck. Further, U.S. Pat. No. 8,991,756 discloses a crew rest station including an overhead crew rest portion with forward and aft bunk portions arranged around a central deck portion. The central deck portion includes an emergency escape hatch, a fold-down jump seat, and a fold-down entry door capable of covering a stairway of a central entry vestibule, via which the overhead crew rest portion may be accessed from the passenger seating area.

Such compartments may be required to meet regulatory requirements for crew rest compartments in aircraft as set forth by the Federal Aviation Administration (FAA) of the United States Government. In addition, the passenger rest facilities should be easily accessible to participating passengers occupying the premium areas while minimizing added weight and minimizing disruption to the interior space and passenger seating within the premium areas.

To rest comfortably a passenger must have a sense of privacy. It is nevertheless important to monitor the passenger rest compartment for the safety of the passenger and all other aircraft occupants.

SUMMARY

In one aspect, embodiments of the inventive concepts disclosed herein are directed to a passenger rest cabin monitoring system. An aircraft may include an upper passenger rest cabin and/or a lower passenger rest cabin. For example, a vestibule can be disposed in a passenger cabin of an aircraft. The vestibule can include at least one staircase for accessing a passenger rest cabin above or below the passenger cabin of the aircraft. In some embodiments, the vestibule includes a first chamber with a first staircase for accessing an upper passenger rest cabin and a second chamber with a second staircase for accessing a lower passenger rest cabin. The passenger rest cabin (or cabins) can include a plurality of passenger rest compartments (e.g., bunks or berths) that include beds, passenger service units (PSUs) and possibly other passenger amenities. In embodiments, the monitoring system includes infrared cameras (and possibly visual cameras) disposed in respective passenger rest compartments, a flight attendant information system including at least one display and at least one speaker, and a computing device in communication with the infrared cameras and the flight attendant information system. The computing device is configured to detect a temperature of a portion of passenger rest compartment based on one or more thermal images generated by a respective infrared camera of the passenger rest compartment. The computing device is further configured to compare the temperature of the portion of the passenger rest compartment with a predetermined critical temperature and provide an audible alert and/or a visual alert via the flight attendant information system to indicate a critical status of the passenger rest compartment when the temperature of the portion of the passenger rest compartment is above the predetermined critical temperature.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
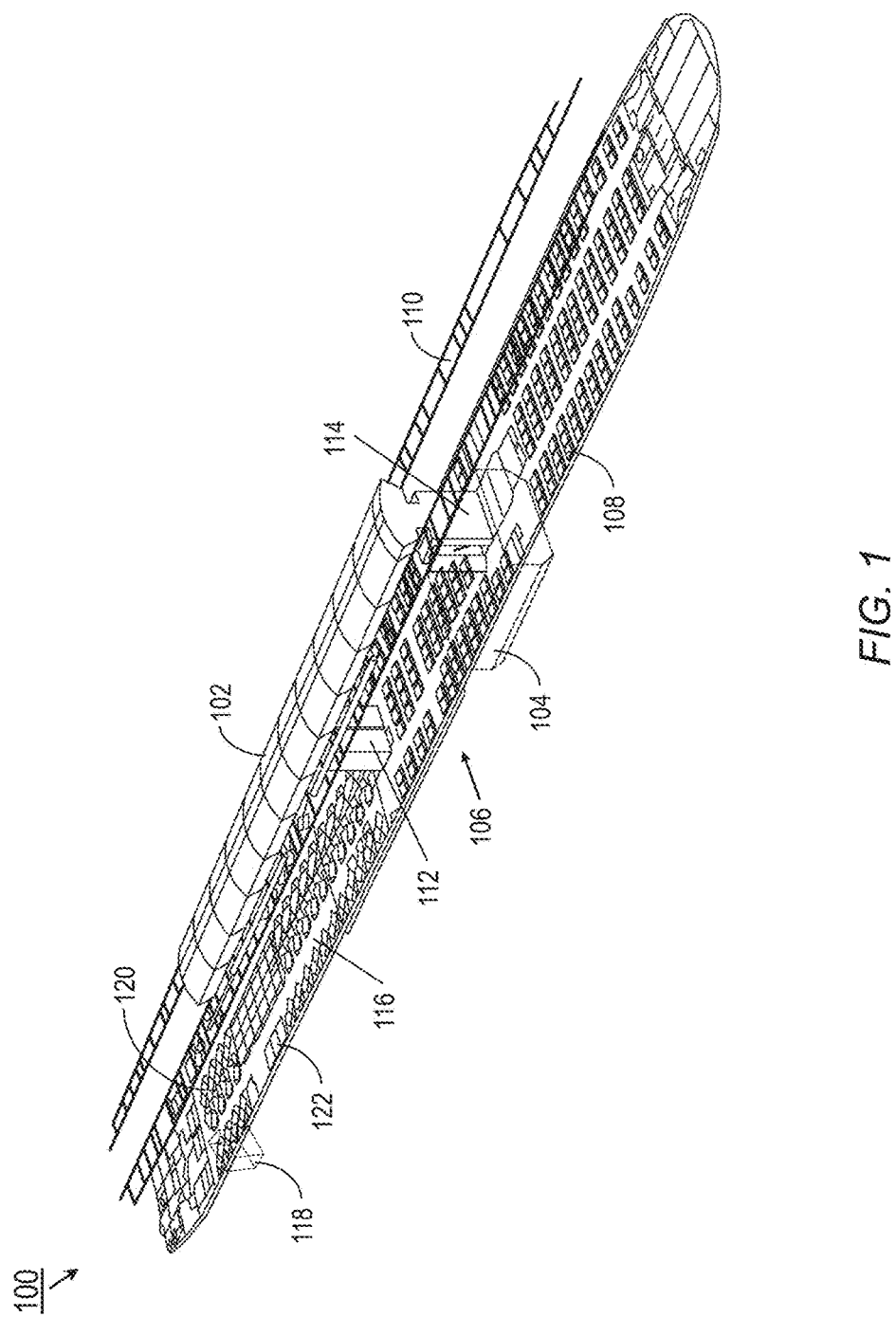
FIG. 1 is a perspective internal schematic view of a passenger aircraft, in accordance with an example embodiment of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a passenger aircraft capable of providing rest compartments for passengers within remote areas of the aircraft, and to a non-intrusive passenger rest cabin/compartment monitoring system. "Remote areas" refers to portions of the aircraft outside the main passenger cabin potentially occupiable by passengers. For example, passenger rest compartments (e.g., berths, bunks) may be incorporated into the overhead crown area of the fuselage, directly above the main passenger cabin. Additionally or alternatively, rest compartments may be incorporated into a lower lobe area under the main passenger cabin, such as a cargo deck. In either case, passenger rest compartments may be incorporated into a larger cabin structure above or below the main passenger cabin and accessible therefrom by passengers, e.g., when the aircraft reaches a safe cruising altitude. Unlike rest cabins dedicated to use by aircraft pilots and cabin crew, the passenger rest cabins may be accessible from the main passenger cabin rather than isolated therefrom. Similarly, the passenger rest cabins and their individual rest compartments may incorporate additional safety features and amenities developed with passenger use in mind.

It is noted herein that an aircraft including an aircraft suite with an overhead passenger rest cabin and a lower lobe passenger rest cabin may be configured to meet or exceed regulatory requirements for crew rest compartments in aircraft as set forth by the Federal Aviation Administration (FAA) of the United States Government. The regulatory requirements may be codified (e.g., including, but not limited to, regulations codified in 14 C.F.R. 25: Airworthiness Standards: Transport Category Airplanes and 14 C.F.R. 117: Flight and Duty Limitations and Rest Requirements: Flight Crew Members). In addition, the regulatory requirement may include special condition regulations set forth for specific aircraft (e.g., including, but not limited to, regulations such as those found in 68 FR 18843: Special Conditions: Boeing Model 777 Series Airplanes; Overhead Crew Rest Compartments, and 79 FR 2359: Special Condition: Airbus Model A350-900 Series Airplane Crew Rest Compartments). Further, the regulatory requirements may be provided in advisory circulars (e.g., including, but not limited to, Advisory Circular AC117-1).

It is contemplated that passenger rest compartments will not be occupied by passengers during taxi, takeoff and landing (TTL) flight segments. Rather, passengers will occupy their assigned seats in the main passenger cabin during said flight segments. When the aircraft reaches a safe cruising altitude (e.g., when passengers are generally permitted to leave their seats), those passengers having access to a rest compartment may be permitted to access their assigned rest compartment if they so choose. Passenger access to rest compartments may be via a dedicated vestibule adjacent to one or more central aisles (e.g., adjacent to, and accessible via, both aisles of a double-aisle aircraft). Access doors in the vestibule may lead to compact staircases or similar means of ascent or descent by which passengers may reach the overhead or lower-lobe rest cabins. Each remote area of the aircraft wherein rest cabins are incorporated (e.g., the overhead crown area or lower-lobe cargo deck) may have a dedicated ascent/descent device, such that the progress of passengers wishing to ascend into an overhead cabin is not obstructed by that of passengers wishing to descend into the lower lobe area. Rest cabins may incorporate a transitional space or landing between the ascent/descent staircase and the individual bunks, which space may include a station space where flight attendants and crew may access emergency equipment storage (e.g., first aid supplies, fire containment bags) and communications facilities. Alternatively, the transitional space may include temporary seating facilities for an on-site crewmember, proximate to storage and facilities. The transitional space may temporarily accommodate a passenger entering or leaving the rest cabin. It is contemplated that under normal conditions, one or more cabin crewmembers may be dedicated to monitoring the rest cabins inflight; however, said crewmembers may remotely monitor the rest cabin from the main deck (e.g., via the aforementioned sensor system), responding to the rest cabin if their attention is required as described below. A flight attendant/crew station as described above may be positioned at either vertical end of a bidirectional entry vestibule, e.g., at the respective entrances to the overhead passenger rest cabin (at its aft end) and the lower lobe rest cabin. Additional crew stations may be positioned, e.g., at the opposing forward end of the overhead passenger rest cabin and in the portion of the lower lobe rest cabin most distant from the entry station. For example, additional lower lobe rest stations may be positioned at the opposing end of a corridor passing through a single lower lobe rest cabin module, or at the point of transition between two adjacent lower lobe rest cabin modules. In some embodiments, a second entry vestibule may be positioned at the forward or terminal end of the overhead passenger rest cabin, via which passengers and crew may enter or exit the overhead passenger rest cabin.

Each rest cabin may include additional access hatches for the emergency use of passengers or crew. Should the aircraft encounter severe turbulence or other adverse conditions, passengers may be instructed to return to the main cabin and occupy their assigned seats. In some cases, cabin crew may advise those passengers occupying rest compartments to remain there, e.g., until it is determined that passengers may safely return to their seats. Each rest compartment may include a bunk occupiable by a passenger in a prone or reclined position, allowing the passenger to rest or sleep therein. Individual bunks may be arranged within a rest cabin so as to maximize the amount of standard bunks within a rest cabin of a given size (e.g., equivalent in volume to a standard cargo compartment) without truncating the size of any individual bunk. For example, two or more bunks may be stacked atop each other within a rest cabin. Individual bunks may be disposed at a fixed angle to others, e.g., substantially parallel or perpendicular to the longitudinal axis (roll axis) of the aircraft. Alternatively, individual bunks may be arranged longitudinally on either side of a central aisle, by which each bunk may be accessed.

It is contemplated that cabin crew may not be physically present to monitor rest cabins in person, although some rest cabins may be configured to include a seating element temporarily occupiable by a crewmember. The rest cabins may be monitored remotely by cabin crew on the main deck, who may be alerted if conditions therein merit a response. For example, "rough" or low-resolution infrared sensors may monitor the rest cabin and individual compartments without intruding upon the privacy of occupying passengers, while visual cameras may monitor common areas of the rest cabin. Sensors and/or cameras may monitor the presence or absence of passengers, movement, and heat signatures, alerting the cabin crew if conditions warrant. If, for example, conditions consistent with an unauthorized presence (e.g., a passenger is present within a rest cabin or rest compartment when s/he should not be), an altercation between passengers, adverse environmental conditions, a medical emergency (e.g., as determined by anomalous movement of a given passenger over time), or a potential fire (e.g., excessive heat persisting over time) are detected, the crew may be alerted or summoned to the rest cabin depending upon the severity of the scenario. Rest cabins may incorporate preventative safety measures in order to prevent or reduce the risk of such emergency scenarios. For example, as the charging of mobile devices (in particular, the rechargeable batteries of cellular phones or tablets) may contribute to the risk of onboard fire, charging devices (e.g., inductive wireless charging devices) may be provided for passengers occupying the rest cabin within a fireproof enclosure, such that a device may not be charged unless placed therein. Such fireproof charging facilities may be placed proximate to an infrared sensor for added safety. Similarly, portable fire containment bags (FCB) will be securely stored throughout the overhead and lower lobe rest cabins for the containment of any mobile devices or batteries thereof that are catching fire or determined to be at risk of combustion. Infrared temperature sensors may further be positioned to cover the whole of the common area (e.g., shared spaces or common access corridors). The temperature sensors, in concert with onboard smoke detectors, may determine not only the presence of a fire, but its location, such that cabin crew may respond quickly and passengers evacuated to the main cabin by unobstructed routes.

Each bunk may incorporate a privacy partition and may be equipped with safety features comparable to a main-deck seat, such as a safety belt and deployable oxygen mask, as well as a passenger service unit (PSU) incorporating a positionable reading light, call button, panic button, and adjustable gasper outlet. Each rest compartment may further include a two-way audio connection so that the occupant may communicate with cabin crew. Rest compartments may incorporate work surfaces that fold out or down into the compartment from the wall or ceiling for the temporary use of occupants. As individual rest compartments may lack a physical window, the compartments may incorporate a "virtual window", whereby a display surface connected to exterior cameras or image sensors provides attitude cues to the occupant via externally captured images. The display surface may be embedded into the compartment wall or pivotably attached, such that a single display surface may serve as a virtual window while substantially flush with the wall but may be pivoted out or down for access to the inflight entertainment system.

A passenger rest cabin incorporated into the overhead crown area may be modular (e.g., comprising one or more connected or linked modules), such that the size of the rest cabin may be scaled up or down depending on the size of the embodying aircraft or the desired number of rest compartments. Similarly, one or more modular overhead rest compartments may be easily installed into the aircraft during an outfit or refit, with portions of the modular overhead passenger rest cabins dedicated to electrical, ventilation, or other service connections between modules. The overhead passenger rest cabin may be proportioned to maximize the available space for individual rest compartments and access corridors while minimally intruding upon the space of main cabin passengers. For example, in order to maximize the height of the overhead cabin access corridor, the main cabin ceiling may be lowered, e.g., over the centermost seats. Similarly, main cabin lavatories may be "notched", or partially reduced in height or truncated, to accommodate the overhead passenger rest cabin.

As noted above, it is contemplated that the overhead passenger rest cabin will not be occupied by passengers during any flight segment, or under any conditions, where immediate evacuation of the aircraft may be necessary (e.g., TTL phases or periods of excessive turbulence or other adverse environmental conditions). Accordingly, the overhead passenger rest cabin may be equipped with bi-directional hatches deployable into an aisle of the main cabin. For example, should conditions within the overhead cabin warrant the evacuation of passengers or the rapid intervention of cabin crew, the bi-directional hatches may include access ladders that deploy downward into the main cabin. Passengers may rapidly exit the overhead cabin, and cabin crew may likewise rapidly ascend into the overhead cabin, via the access ladders. Bi-directional hatches may be easily deployable by passengers; e.g., a single lever or button may release the access ladder from its restraints while activating any necessary emergency lights or warnings.

The overhead passenger rest cabins, as noted above, may incorporate individual rest compartments situated along either side of a central corridor and accessible therefrom. It is contemplated that due to the limited interior space available for incorporating the overhead passenger rest cabin into an aircraft interior while minimally intruding upon main cabin space, the central access corridor may be of limited height, such that passengers of average size may not be able to traverse the access corridor without crouching to some extent. Accordingly, the central access corridor may incorporate handholds at regular intervals therealong, sized and placed to reduce strain associated with remaining in a crouched position while traversing the corridor. Similarly, the access corridor may include shifts in lighting or ventilation along its length to prevent claustrophobia; transitional spaces may be positioned along the corridor to "break up" the space.

Similarly to the overhead crown rest cabin, the lower lobe rest cabins may be modular in nature. For example, the lower lobe rest cabins may be sized and shaped to match the proportions of a cargo container, such that one or more such rest cabins may be easily incorporated into the lower cargo deck. The modular rest cabins may likewise include dedicated entry and exit portals and electrical, airflow, and other service connections therebetween, such that the overall amount of available lower lobe bunk space may be scaled up or down as needed or desired. For example, passengers may descend into a first lower lobe rest cabin, which may include transitional space and/or temporary crew seating facilities, and pass therefrom into successive rest cabins through the entry and exit portals. Lower lobe rest cabins may include additional ceiling hatches deployable if rapid evacuation of the rest cabins upward into the main cabin is necessary. In some embodiments, lower lobe rest cabins may include modular pairs of interconnected rest cabins. For example, a first cabin and a second cabin may be interconnected such that a first space within the first cabin and a second adjoining space within the second cabin may be combined into a full-size rest compartment or bunk shared between the two cabins, where neither the first space nor the second space would alone be large enough to accommodate a full rest compartment.

Additionally or alternatively, embodiments of the inventive concepts disclosed herein are directed to a passenger aircraft incorporating additional reserved spaces adjacent to, and accessible from, selected lay-flat or tracked aircraft seats. For example, first-class, business-class, or equivalent passengers may be assigned main-deck seats capable of tracking backward or forward, or of reconfiguration into a lay-flat state whereon the passenger may occupy the seat in a prone position. Such lay-flat seats or tracking mechanisms may conceal a hatch set into the main deck floor, whereby the occupying passenger may access a private or semi-private compartment, e.g., on the cargo deck immediately below the main deck. Said private or semi-private compartment (e.g., two adjacent seats may share a compartment) may provide an alternative seating area or bunk area for the passenger while preserving available space on the main deck for other seating facilities; compartments may be windowless but equipped with "virtual windows" as described above.

FIG. 1—Aircraft Layout, Generally

Referring to FIG. 1, an example embodiment of a passenger aircraft 100 according to the inventive concepts disclosed herein may include overhead passenger rest cabins 102 and lower lobe passenger rest cabins 104. For example, the aircraft 100 may include only overhead passenger rest cabins 102, only lower lobe passenger rest cabins 104, or both. Overhead passenger rest cabins 102 may be incorporated into the overhead crown area of the aircraft 100, above the main passenger cabin 106 (e.g., main deck) and the passenger seats 108, overhead bins 110, and monuments 112 (e.g., storage monuments, galley monuments, audio-visual monuments housing an inflight entertainment system, lavatories). Lavatories, monuments 112, zone dividers, or other structures proximate to the longitudinal center of the main passenger cabin 106 may be notched or otherwise modified to accommodate the overhead passenger rest cabin 102. Similarly, lower lobe passenger rest cabins 104 may be incorporated on a cargo deck directly underneath the main passenger cabin 106. Passengers may access the overhead passenger rest cabins 102 or lower lobe passenger rest cabins 104 via an entry vestibule 114 located within the main passenger cabin 106. The vestibule 114 includes at least one staircase or ladder for accessing an overhead passenger rest cabin 102 or a lower lobe passenger rest cabin 104. In some embodiments, the vestibule includes a first chamber with a first staircase for accessing the overhead passenger rest cabin 102 and a second chamber with a second staircase for accessing the lower lobe passenger rest cabin 104. For example, the vestibule can include side-by-side chambers (e.g., separated by one or more wall structures) and/or vertically stacked chambers (e.g., separated the (first) staircase for accessing the overhead passenger rest cabin 102).

The entry vestibule 114 may connect the overhead passenger rest cabins 102 and the lower lobe passenger rest cabins 104 (when both are incorporated within the aircraft 100) while providing a separate path for passengers to access each rest cabin from the main passenger cabin 106 (e.g., via ascending or descending staircases). It is contemplated that the entry vestibule 114 will be the primary means of passenger access to the overhead passenger rest cabins 102 and the lower lobe passenger rest cabins 104, and the sole means of access during non-emergency conditions. In some embodiments, the entry vestibule 114 may be located at the aft end of the overhead passenger rest cabin 102, and an auxiliary vestibule (114a) may provide a secondary entrance and exit to and from the main passenger cabin 106 and the overhead passenger rest cabin 102. The overhead passenger rest cabins 102 may include additional escape hatches (not shown) providing an emergency escape route (e.g., to main aisles 116 of the main passenger cabin 106) for passengers to rapidly exit the overhead passenger rest cabins. The lower lobe passenger rest cabins 104 may similarly include escape hatches for emergency return to the main passenger cabin 106. In some embodiments, the aircraft 100 may incorporate additional lower lobe rest compartments 118 situated on the lower cargo deck. For example, the additional lower lobe rest compartments may be located substantially underneath selected partitioned premium seats 120 or premium compartments 122 in premium seating sections of the aircraft 100 and accessible to the occupants of said premium seats or premium compartments (e.g., during safe cruising segments) via proximate hatches in the main deck floor.

Figure 2:
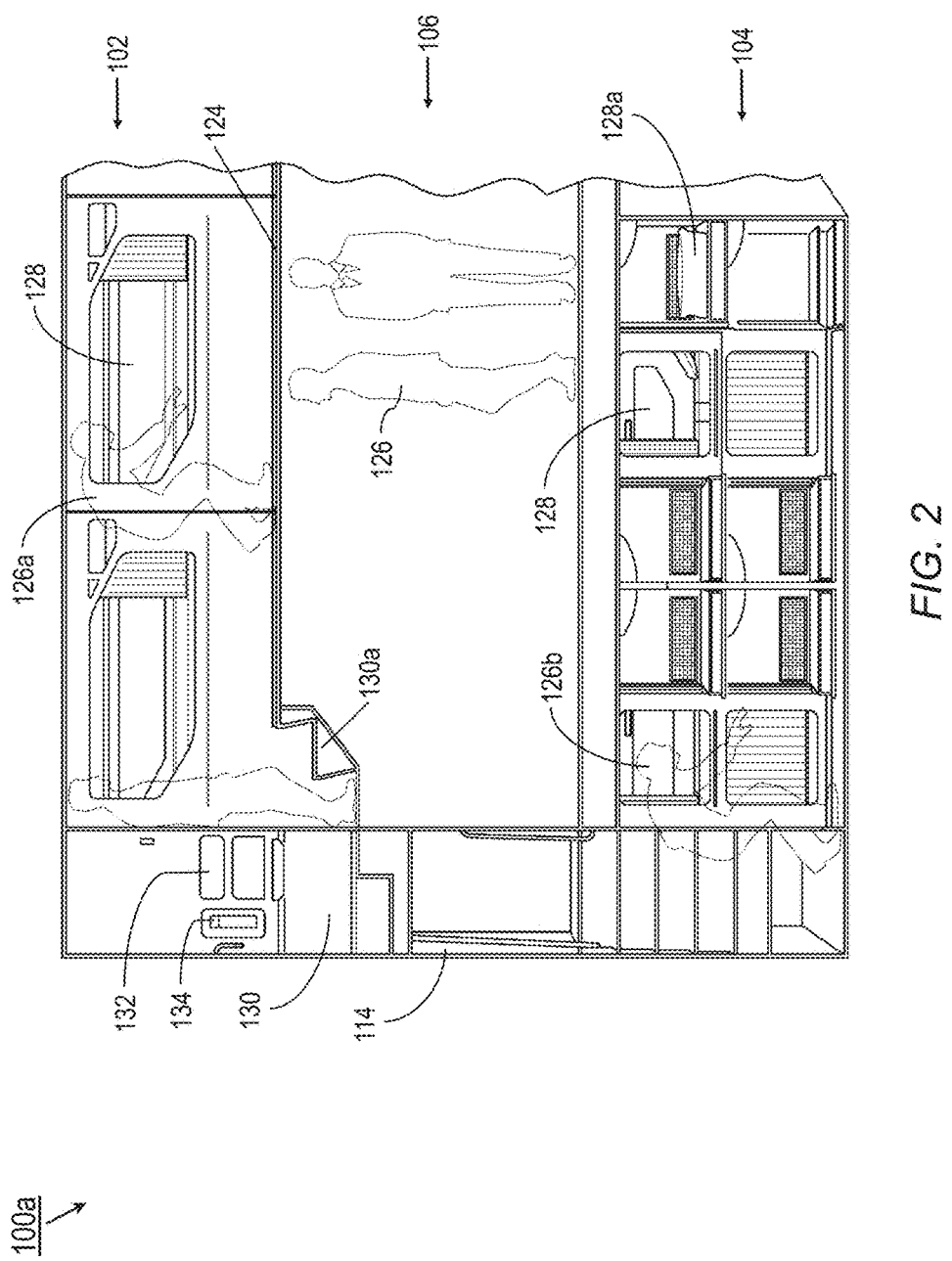
FIG. 2 is a cross-sectional side schematic view of a portion of a passenger aircraft, in accordance with an example embodiment of this disclosure.

FIG. 2—Relative Cabin Proportions

Referring to FIG. 2, the passenger aircraft 100a may be implemented and may function similarly to the aircraft 100 of FIG. 1, except that the aircraft 100a may include an overhead passenger rest cabin 102 and a lower lobe passenger rest cabin 104 connected by an entry vestibule 114 to the main passenger cabin 106. For example, the overhead passenger rest cabin 102 may be incorporated into remote space above the main passenger cabin 106 such that the floor of the central corridor 124 of the overhead passenger rest cabin corresponds substantially to the ceiling of the main passenger cabin 106 (e.g., over the centermost portion of the main cabin). The height of the overhead passenger rest cabin 102 that a passenger 126 of average height may remain comfortably standing, e.g., in a main aisle 118 (FIG. 1) of the main passenger cabin. However, space limitations within the aircraft 100a may require passengers 126a and 126b respectively traversing the overhead passenger rest cabin 102 and lower lobe passenger rest cabin 104 to do so in a partially crouched position. The overhead passenger rest cabin 102 may include individual passenger rest compartments 128 or bunks extending along either side of the central corridor 124, substantially parallel to the longitudinal or roll axis of the aircraft 100a. The overhead passenger rest cabin 102 may include a transitional space 130 between the entry vestibule 114 and the central corridor 122; the transitional space may include emergency equipment storage 132 and an emergency handset 134 for communicating with the cockpit or cabin crew, or additional steps 130a linking the entry vestibule and the central corridor. Similarly, the lower lobe passenger rest cabin 104 may incorporate individual passenger rest compartments 128 aligned substantially parallel to the roll axis as well as passenger rest compartments 128a aligned at an angle to the roll axis, e.g., perpendicular to the roll axis or substantially parallel to the pitch axis of the aircraft 100a.

Figure 3A:
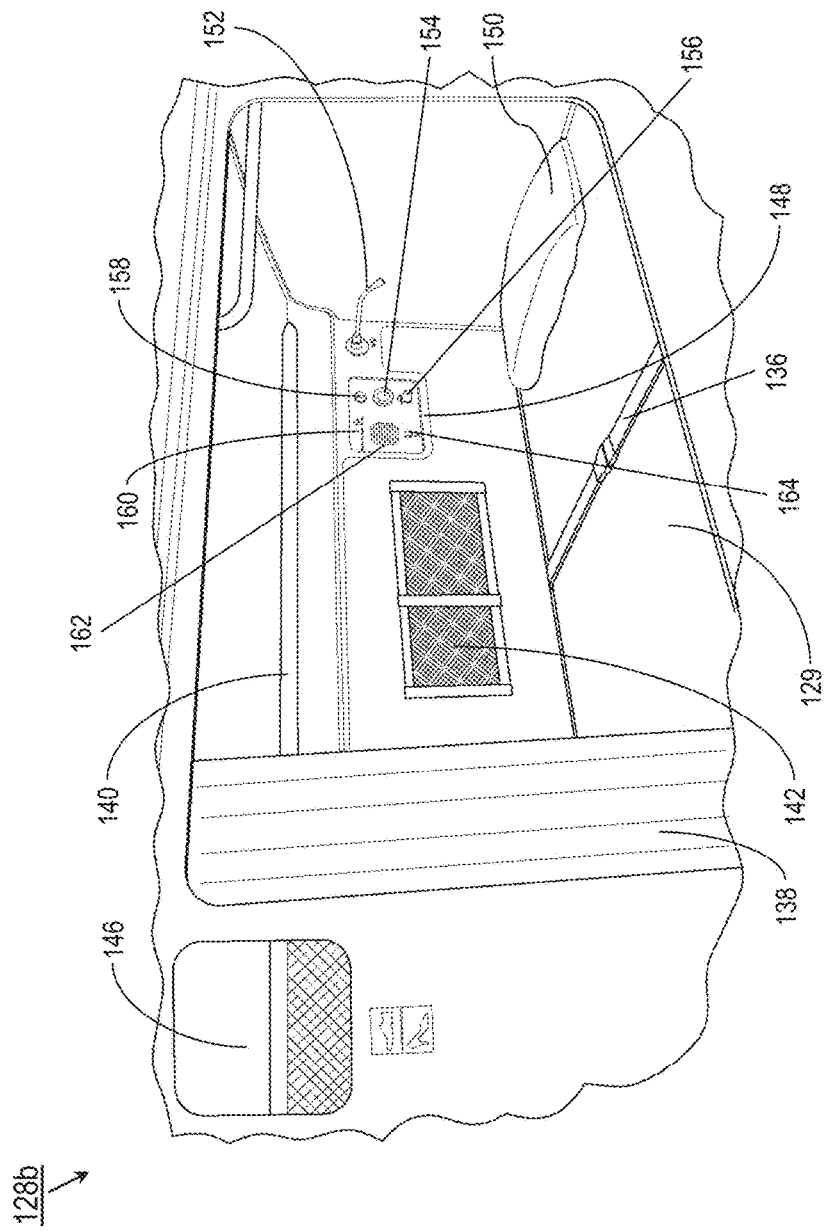
FIG. 3A is a perspective schematic view of a passenger rest compartment for a passenger aircraft, such as the passenger aircraft illustrated in FIG. 1 and/or FIG. 2, in accordance with an example embodiment of this disclosure.

FIG. 3A/B—Individual Bunks

Figure 3B:
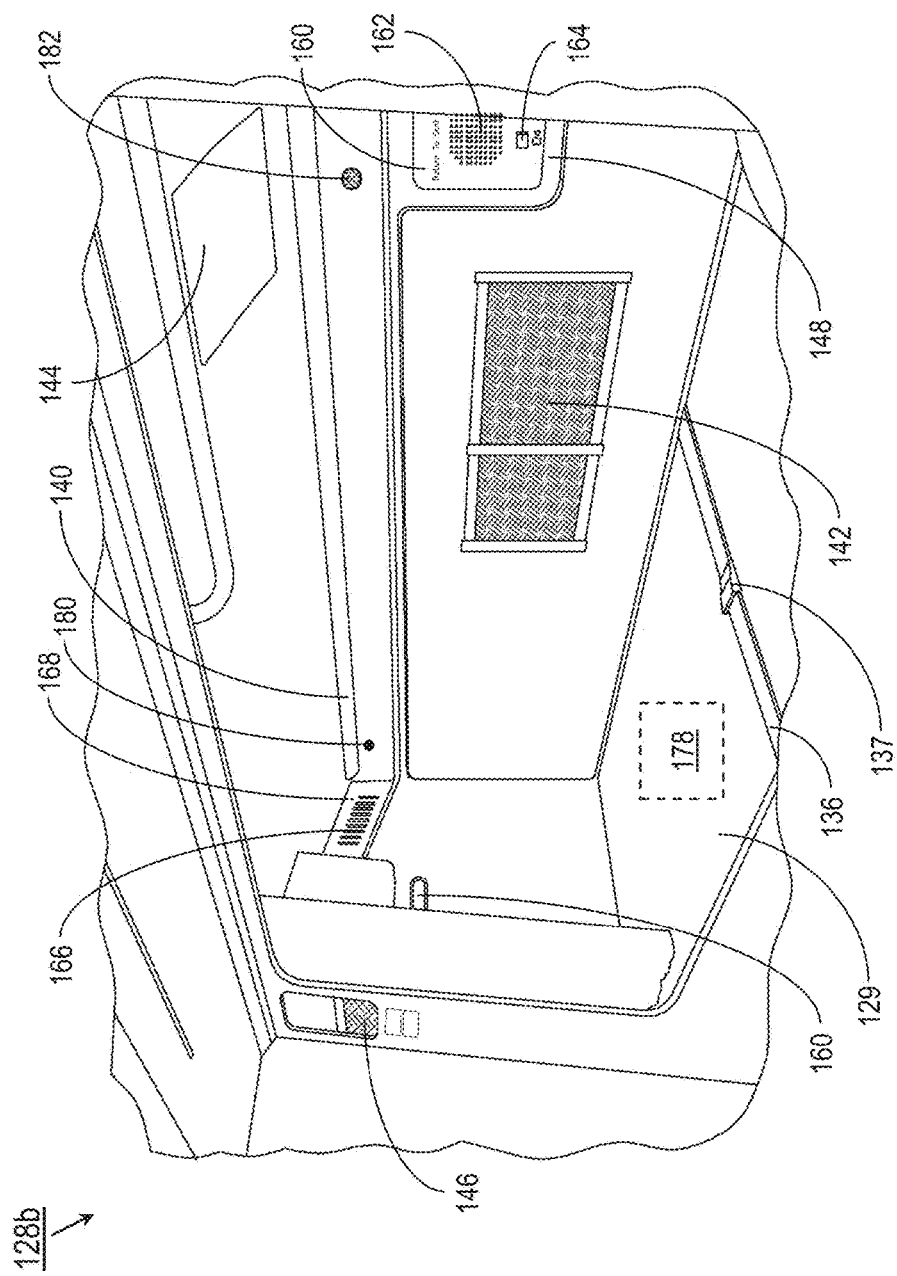
FIG. 3B is another perspective schematic view of the passenger rest compartment illustrated in FIG. 3A, in accordance with an example embodiment of this disclosure.

Referring to FIGS. 3A and 3B, the passenger rest compartment 128b (bunk) may be implemented and may function similarly to the passenger rest compartments 128, 128a of FIG. 2, except that the passenger rest compartment 128b may include a safety belt 136, a privacy partition 138 (e.g., privacy curtain), ambient lighting 140, interior stowage compartments 142, an emergency oxygen drop 144, ventilated shoe stowage compartments 146 (which may, for example, be situated or accessed immediately outside or adjacent to the rest compartment), and a passenger service unit 148 (PSU). For example, the PSU 148 may be positioned proximate to the head end of the rest compartment 128b (e.g., where a pillow 150 may be provided for the passenger's head). The PSU 148 may include a positionable reading light 152 and gasper outlet 154, temperature controls 156, a panic/crew call button 158, lighted signage 160 (e.g., signaling the occupying passenger to return to his/her seat, fasten his/her safety belt 136, no smoking). The PSU may further include a speaker/microphone 162 and call button 164 allowing private two-way audio communication between the occupying passenger and the cabin crew.

Referring in particular to FIG. 3B, the foot end of the passenger rest compartment 128b may include an air return 166 and one or more infrared sensors 168 (e.g., infrared camera(s), light emitting diode (LED) sensor(s)/sensor array(s), or the like, operating in the infrared illumination spectrum (e.g., 700 nm-1000 nm)). The passenger rest compartment 128b may include additional sensors or devices for monitoring passenger status, for example, a safety belt monitor 137 for detecting buckled/unbuckled status of the safety belt 136, a force sensor 178 in the bed 129 for detecting a weight of the passenger and other contents disposed in the passenger rest compartment 128b, a visual camera 180 (which, in some configurations, may be selectively enabled/disabled, as described below), and/or a hazard detector 182 (e.g., a smoke detector, a carbon monoxide detector, a radiation detector, an electric field detector, and/or a magnetic field detector, or the like). In some embodiments, the passenger rest compartment 128b can also include an inflight entertainment display and/or a virtual window, e.g., as described in U.S. patent application Ser. No. 16/126,952, filed Sep. 10, 2018, which is incorporated herein by reference in its entirety.

In embodiments, the sensory devices (e.g., infrared sensor 168, force sensor 178, camera 180, hazard detector 182, safety belt monitor 137, etc.), PSU 148, display/virtual window, and other electronics in each passenger rest compartment 128b are input/output devices of a passenger rest cabin monitoring system, such as the passenger rest cabin monitoring system 200 described below.

Figure 4:
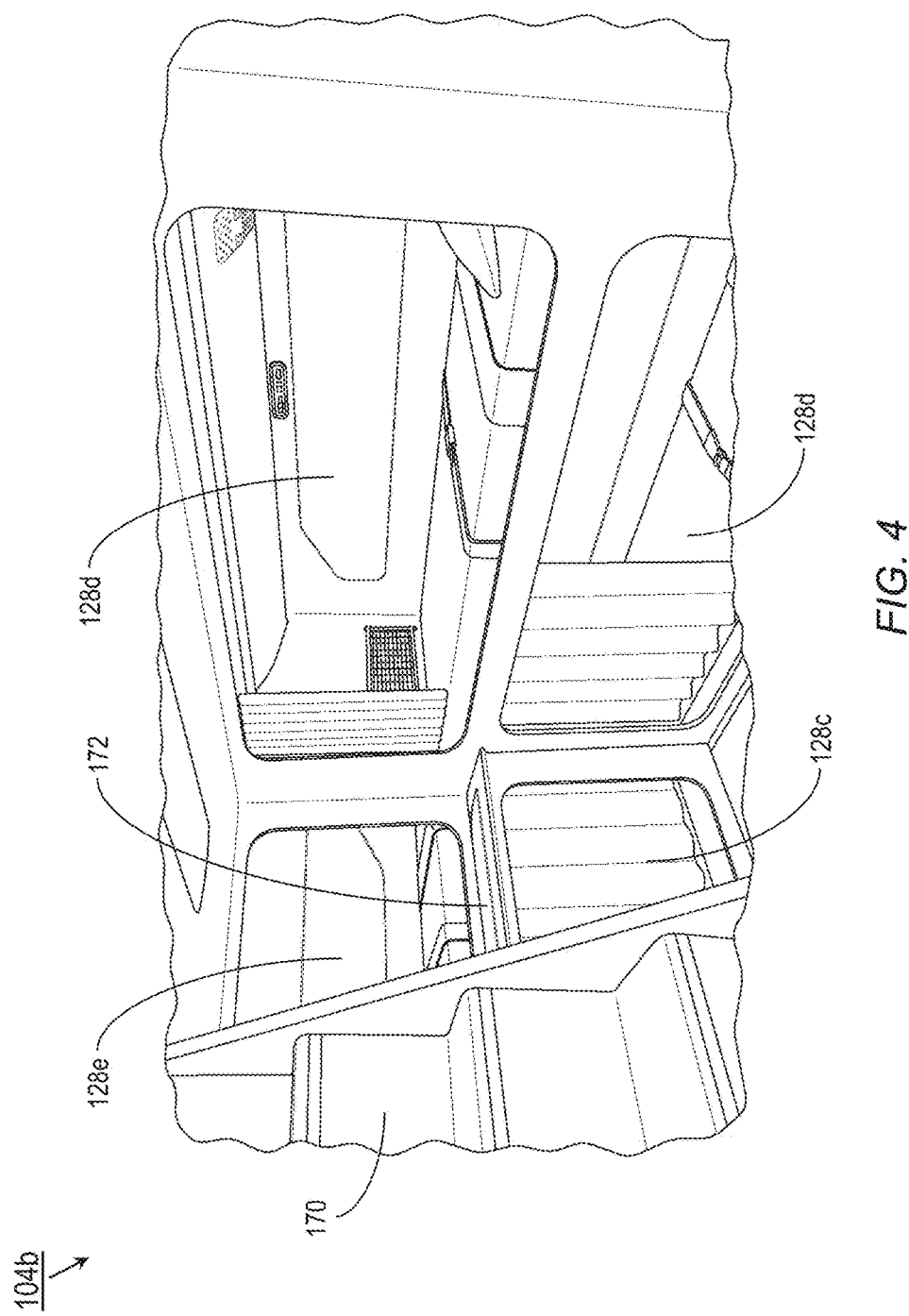
FIG. 4 is a perspective schematic view of a portion of a lower lobe passenger rest cabin for a passenger aircraft, such as the passenger aircraft illustrated in FIG. 1 and/or FIG. 2, in accordance with an example embodiment of this disclosure.

FIG. 4—Lower Lobe Cabin Layout

Referring to FIG. 4, the lower lobe passenger rest cabin 104b may be implemented and may function similarly to the lower lobe passenger rest cabin 104 of FIG. 2, except that the lower lobe passenger rest cabin 104b may be accessed by a descending staircase 170 connecting the lower lobe passenger rest cabin to the entry vestibule 114 (FIG. 2) and thereby to the main passenger cabin 106. For example, the staircase 170 may descend into the center of the lower lobe passenger rest cabin 104b at a predetermined angle. The passenger rest compartments 128c-e may be implemented and may function similarly to the passenger rest compartments 128b of FIGS. 3A/B, except that the passenger rest compartments 128c, 128 e and the passenger rest compartment 128d may be respectively oriented substantially parallel or at an angle to (e.g., substantially perpendicular to) the longitudinal/roll axis of the aircraft 100 (FIG. 1) and positioned around the perimeter of the lower lobe passenger rest cabin 104b. The passenger rest compartments 128d may be positioned in substantially vertical stacks of two or more bunks, depending on the height of the bunks relative to the height of the lower lobe passenger rest cabin 104b. The passenger rest compartment 128e, for example, may be stacked atop the passenger rest compartment 128c in a staggered fashion, set back from the passenger rest compartment 128 by a shelf 172. For example, the passenger rest compartment 128e may combine space from two adjacent modular lower lobe passenger rest cabins 104b, where neither rest cabin on its own may include sufficient space for a full passenger rest compartment. Lower lobe passenger rest cabins 104, 104a may be proportioned for a form factor compatible with standard cargo containers; individual lower lobe passenger rest cabins may be palletized or otherwise capable of addition to, or removal from, the aircraft 100 via the existing cargo loading/unloading system. Further, depending on size, configuration, and desired capacity, the aircraft 100 may incorporate lower lobe passenger rest cabins (104a) either forward or aft of the lower lobe passenger rest cabin 104 connected to the main passenger cabin 106 via the entry vestibule 114.

Figure 5:
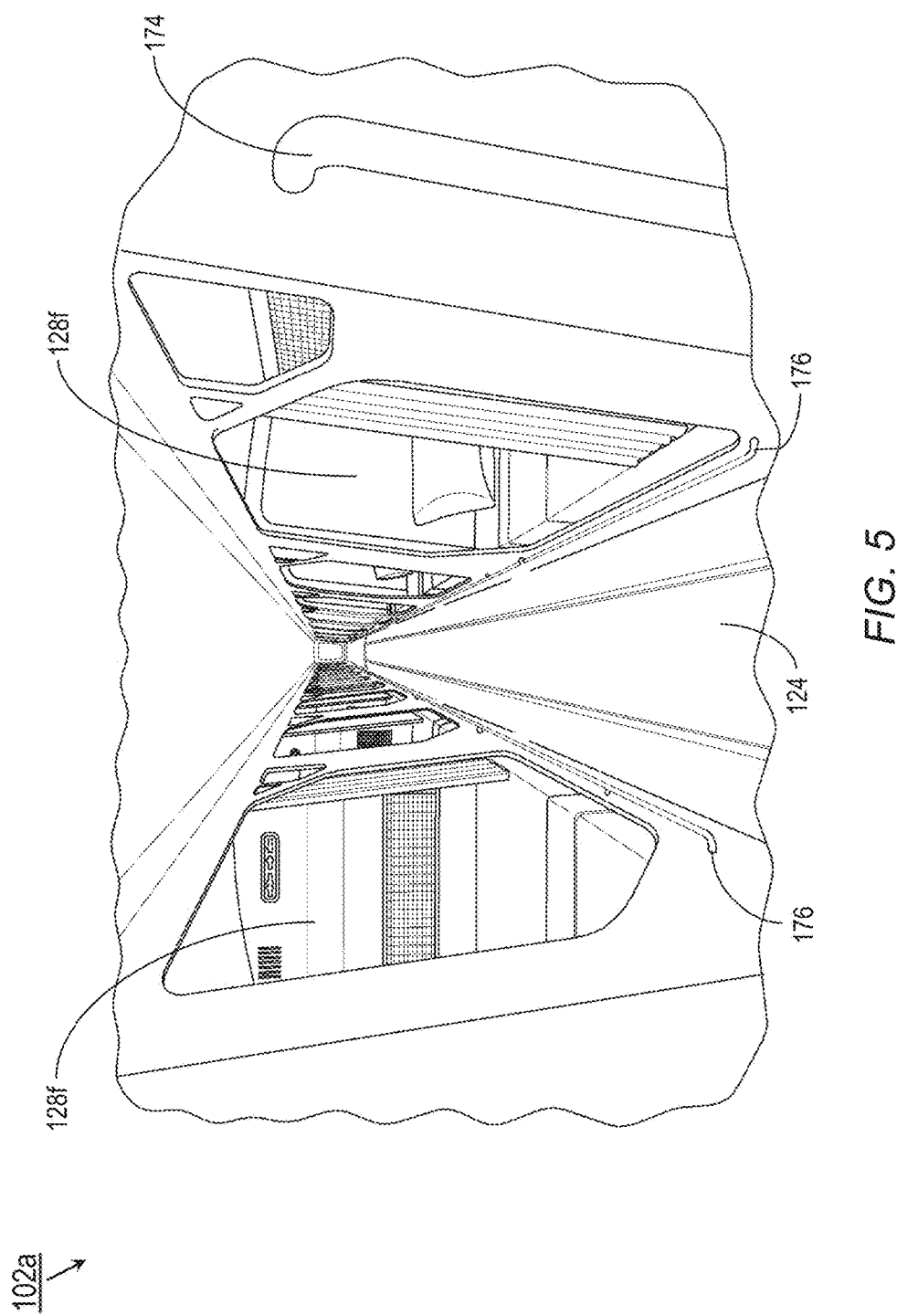
FIG. 5 is a perspective schematic view of a portion of an overhead passenger rest cabin for a passenger aircraft, such as the passenger aircraft illustrated in FIG. 1 and/or FIG. 2, in accordance with an example embodiment of this disclosure.

FIG. 5—Overhead Cabin Layout

Referring to FIG. 5, the overhead passenger rest cabin 102a and individual rest compartments 128f may be implemented and may function similarly to the overhead passenger rest cabin 102 of FIG. 2 and the individual rest compartments 128c-e of FIG. 4, except that the individual passenger rest compartments 128f of the overhead passenger rest cabin 102a may be sequentially arranged along either side of the central corridor 124 extending forward (e.g., substantially parallel to the longitudinal/roll axis of the aircraft 100 (FIG. 1)). For example, the overhead passenger rest cabin 102a may comprise twenty (20) passenger rest compartments 128f: ten compartments on the port side of the central corridor 124 and ten opposite compartments on the starboard side. The transitional space 130 (FIG. 2) between the entry vestibule 114 (FIG. 2) and the overhead passenger rest cabin 102a may include handles 174 graspable by cabin crew or passengers entering the overhead passenger rest cabin via the entry vestibule. Further, graspable handles 176 may be spaced along the central corridor 124; passengers 126a (FIG. 2) traversing the central corridor (e.g., after entering the overhead passenger rest cabin 102a via the entry vestibule 114 and proceeding to their assigned passenger rest compartment 128f) may use the graspable handles to reduce strain while traversing the central corridor in a crouched position. A crew station 178 may be located at the forward end of the overhead passenger rest cabin 102 (including, e.g., emergency storage for first aid and fire containment supplies, communications facilities, and/or temporary jump seating). Similar crew stations may be located within the transitional space (130, FIG. 2) at the aft end of the overhead passenger rest cabin 102 and throughout the lower lobe passenger rest cabin (104, FIG. 4; e.g., proximate to the staircase or the point at which the entry vestibule 114 enters the lower lobe passenger rest cabin).

Figure 6A:
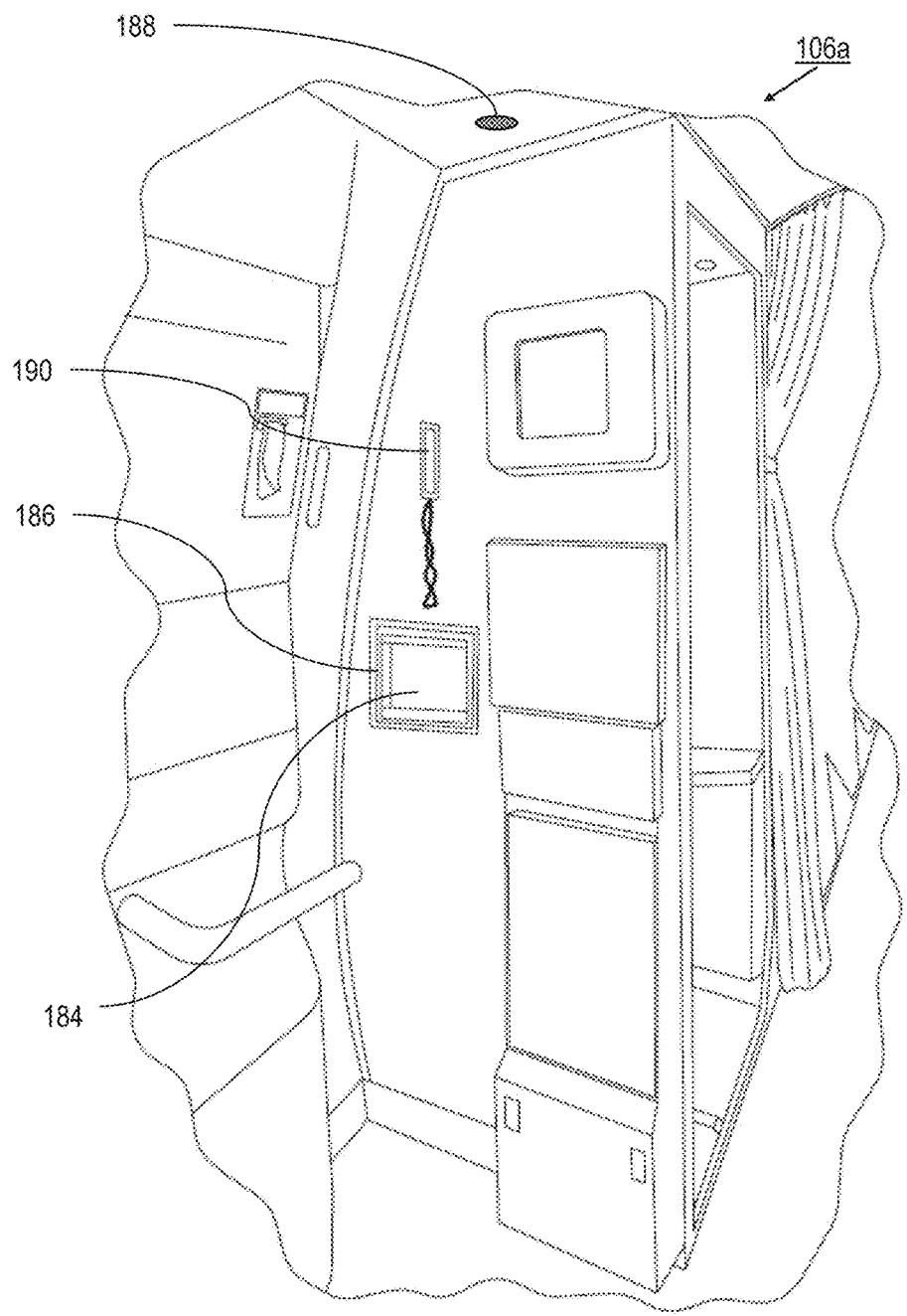
FIG. 6A is a perspective schematic view of a portion of a main passenger cabin for a passenger aircraft, such as the passenger aircraft illustrated in FIG. 1 and/or FIG. 2, including flight attendant alert and/or communication devices, in accordance with an example embodiment of this disclosure.

FIG. 6A/B—Flight Attendant Alert/Communication Devices

Figure 6B:
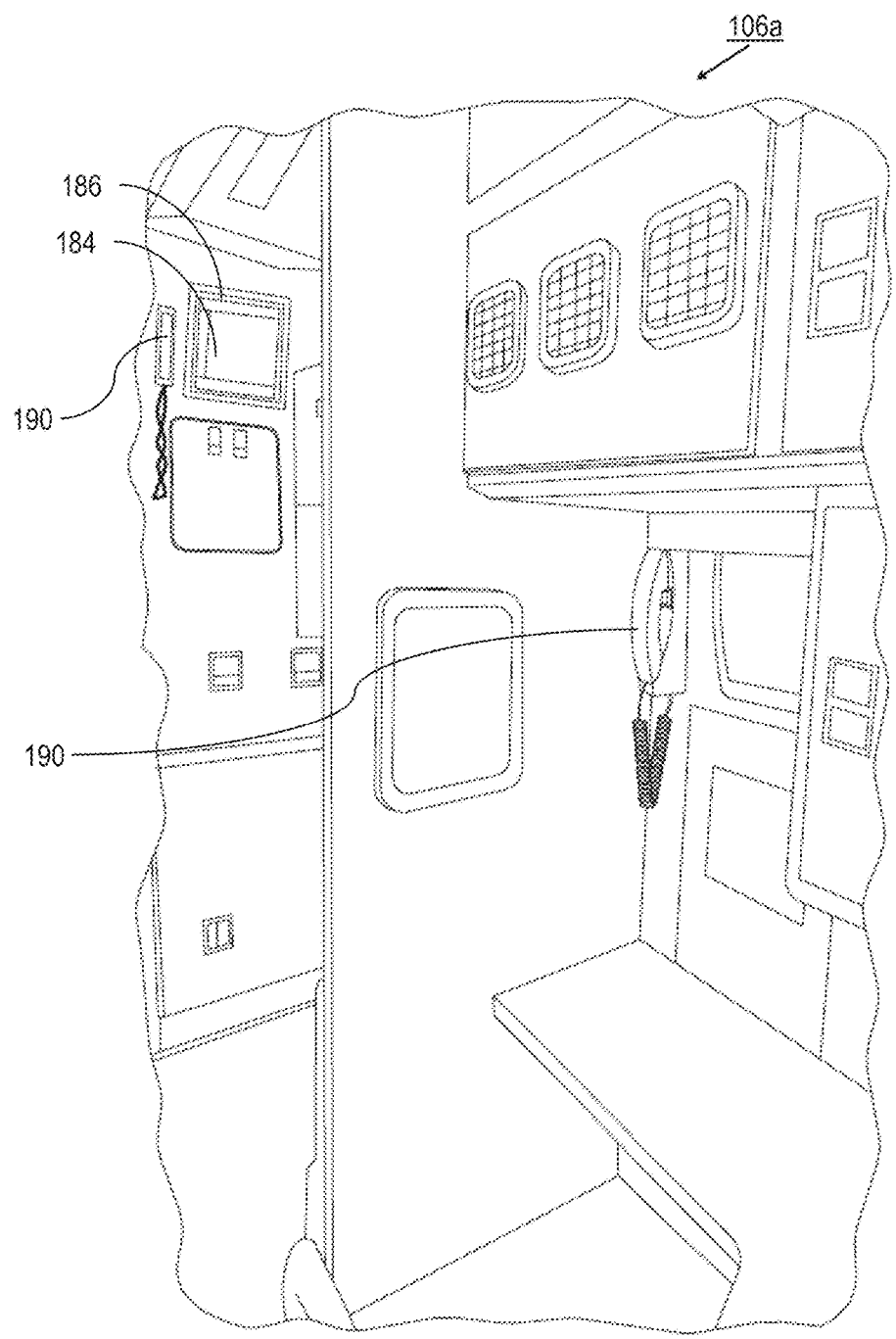
FIG. 6B is a perspective schematic view of a portion of a main passenger cabin for a passenger aircraft, such as the passenger aircraft illustrated in FIG. 1 and/or FIG. 2, including flight attendant alert and/or communication devices, in accordance with an example embodiment of this disclosure.

Referring to FIGS. 6A and 6B, the main passenger cabin 106a may be implemented and may function similarly to the passenger cabin 106 of FIGS. 1 and 2, except that the passenger cabin 106a may include one or more displays 184, speakers 188, and two-way communication devices 190 (e.g., wired/wireless handsets, speaker phones, etc.) for providing alerts/notifications and communications for flight attendants. As shown in FIG. 6A, a display 184 (e.g., LED/LCD display, or the like) may be located in a flight attendant station. In embodiments, the display 184 can be mounted to an articulating base 186 that can swivel, tilt, turn, and/or deploy to make the display 184 easier to view by a flight attendant. The display 184 can be used to show statuses and/or images of passenger rest compartments 128, messages, alerts, notifications, and so forth. In some embodiments (e.g., as shown in FIG. 6B), the display 184 may be mounted on a wall opposite a flight attendant chair (e.g., deployable/stowable chair) so that the display 184 is in direct view of a seated flight attendant. Such a configuration can be beneficial during turbulence or rapid decompression when flight attendants must be seated for their own safety.

Speakers 188 may be disposed throughout the passenger cabin 106a for providing audible alerts (e.g., chimes, broadcast messages, etc.). These speakers 188 may be part of an aircraft system and/or part of a monitoring system integrated within the aircraft. In some implementations, different audible alerts (e.g., different chimes) can be associated with different types of alerts (e.g., passenger discomfort, fire/excessive heat, unauthorized passenger activity, etc.). Cabin lighting may also be used to indicate different types of alerts, for example, by changing color and/or intensity of cabin lighting to provide a notification or indicate a critical status (e.g., fire, explosion, passenger threat, or other hazard).

Flight attendant stations can also include two-way communication devices 190 (e.g., wired/wireless handsets) that enable flight attendants to communicate with other flight attendant stations (e.g., with other communication devices 190) and/or passenger rest compartments 128 (e.g., with PSUs 148). The two-way communication devices 190 may also be used by flight attendants to broadcast messages through the speakers 188. The two-way communication devices 190 can also be used for private communications over dedicated channels that connect the two-way communication devices 190 with individual PSUs 148 in respective ones of the passenger rest compartments 128.

In embodiments, the one or more displays 184, speakers 188, and two-way communication devices 190 are input/output devices of a flight attendant information system, such as the flight attendant information system 210 described below. The flight attendant information system 210 may be integrated with and/or configured to communicate with the passenger rest cabin monitoring system 200.

Figure 7A:
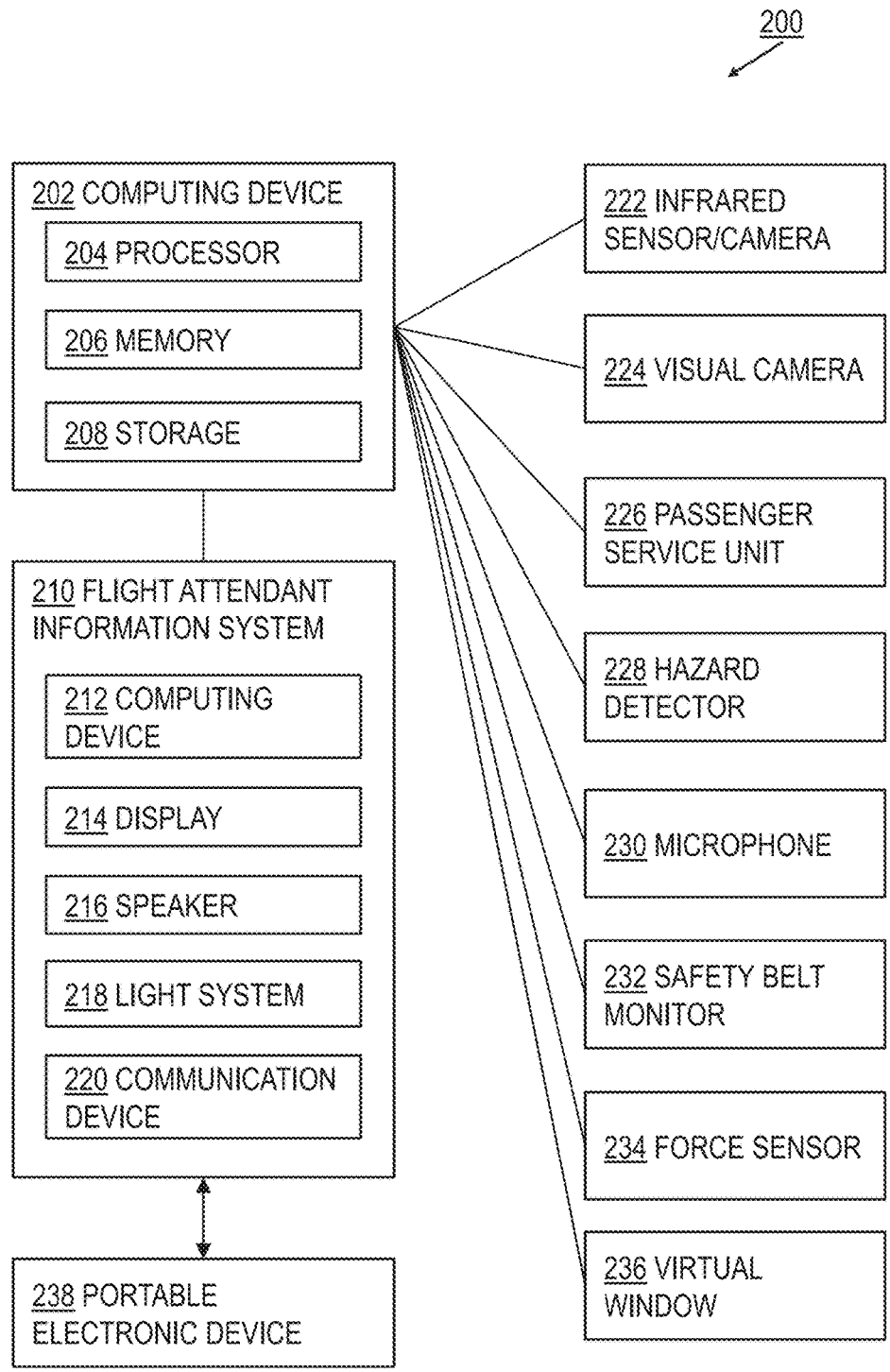
FIG. 7A is a block diagram of a passenger rest cabin monitoring system for a passenger aircraft, such as the passenger aircraft illustrated by any of FIGS. 1 through 6B or any combination thereof, in accordance with an example embodiment of this disclosure.

FIGS. 7A/7B—Passenger Rest Cabin Monitoring System

FIG. 7A illustrates an example embodiment of a passenger rest cabin monitoring system 200 that can be implemented in the aircraft 100/100a described above. In embodiments, the passenger rest cabin monitoring system 200 includes infrared sensors/cameras 222 (e.g., infrared sensors 168) disposed in respective passenger rest compartments 128 and a computing device 202 in communication with the infrared sensors/cameras 222. The computing device 202 may include at least one processor 204, at least one memory 206, and at least one storage device 208, as well as other components, equipment, and/or devices commonly included in a computing device, some or all of which may be communicatively coupled. The processor 204 may be implemented as any suitable processor, such as a single-core or multi-core processor, micro-controller, field programmable gate array (FPGA), or any other programmable logic device/controller (PLD/PLC). The processor 204 may be configured to run various software applications or computer code stored (e.g., maintained) in a non-transitory computer-readable medium (e.g., memory 206 and/or storage 208) and configured to execute various instructions or operations. The computing device 202 may be implemented as any suitable computing device. In some embodiments, the computing device 202 is implemented as a vetronics computing device (e.g., an avionics computing device) in a vehicle, such as an aircraft or automobile. Additionally, for example, the computing device 202 or the processor 204 may be implemented as a special purpose computer or a special purpose processor configured (e.g., programmed) to execute instructions for performing any or all of the operations disclosed throughout. In some embodiments, the system 200 of FIG. 7A may include any suitable number of computing devices 202. While the computing device 202 exemplarily includes elements as shown, in some embodiments, one or more of the elements of the computing device 202 may be omitted, or the computing device 202 may include other elements.

The computing device 202 can be configured to detect a presence of an individual (e.g., a passenger) in a passenger rest compartment 128 based on one or more measurements or thermal images generated by a respective infrared sensor/camera 222 of the passenger rest compartment 128. For example, in embodiments, the computing device 202 is configured to detect the presence of an individual when a measured temperature of the passenger rest compartment 128 exceeds a predetermined threshold temperature (e.g., at least 95° F.) or by identifying a heat signature of an individual in one or more thermal images generated by the infrared sensor/camera 222. In some embodiments, the computing device 202 may include a heat signature database in its storage 208. For example, the heat signature database can include a plurality of heat signatures (e.g., heat distributions/maps and/or temperature thresholds) that correspond to humans, animals, and/or events (e.g., fire, lithium battery runaway temperature, explosion, etc.). The computing device 202 may be configured to detect heat signatures by comparing one or more thermal images captured by the infrared sensor/camera 222 to the heat signatures stored in the heat signature database. The computing device 202 may be in communication with a flight attendant information system 210 and configured to display an indication of the presence of the individual in the passenger rest compartment 128 via at least one display 214 (e.g., display 184) of the flight attendant information system 210. In some embodiments, the flight attendant information system 210 includes a respective computing device 212, which may include a respective processor and memory and/or storage in a similar component configuration to that of computing device 202. In other embodiments, computing device 202 replaces computing device 212 and is the primary computing device for the passenger rest cabin monitoring system 200 and the flight attendant information system 210 (which may be integrated into one system, e.g., system 200). In embodiments, the flight attendant information system 210 includes one or more displays 214 (e.g., displays 184), one or more speakers 216 (e.g., speakers 188), a light system 218 (including lighted signage, indicator lights, and/or general cabin lighting), and one or more communication devices 220 (e.g., two-way communication devices 190). The flight attendant information system 210 may be integrated with and/or configured to access components of a primary aircraft system. For example, the flight attendant information system 220 may be configured to utilize existing lighting, speaker systems, displays, hazard detectors (e.g., smoke and/or carbon monoxide detectors, excessive heat/fire detectors, etc.), alarms, and other components of the primary aircraft system.

The computing device 202 can be further configured to detect a presence of a second individual with the individual (e.g., the presence of two or more passengers) in a passenger rest compartment 128 based on one or more thermal images generated by a respective infrared sensor/camera 222 of the passenger rest compartment 128. For example, the computing device 202 may be configured to detect the presence of two or more individuals in a passenger rest compartment 128 by identifying heat signatures of the individuals in one or more thermal images generated by the infrared sensor/camera 222. The computing device 202 may be configured to display an indication of the presence of two or more individuals in the passenger rest compartment 128 via at least one display 214 (e.g., display 184) of the flight attendant information system 210. It is contemplated that the passenger rest compartments, in most cases, will be designed to accommodate a single passenger occupant. Thus, in embodiments, the computing device 202 can be configured to provide an audible alert (e.g., alarm/chime via the speaker 216) and/or a visual alert (e.g., via the display 214 or light system 218) via the flight attendant information system 210 to indicate the (unauthorized) presence of the second individual with the individual in the passenger rest compartment 128. In some embodiments, the computing device 202 can also be configured to provide an audible alert (e.g., alarm/chime via the speaker 216) and/or a visual alert (e.g., via the display 214 or light system 218) via the flight attendant information system 210 to indicate the unauthorized presence of an individual in a passenger rest compartment 128 when the passenger rest compartment 128 has not been reserved for use by the individual.

In embodiments, the computing device 202 may be configured to monitor temperatures in respective passenger rest compartments 128 and/or other portions (e.g., corridor) of the passenger rest cabin 102/104 to detect excessive heat or drops in temperature that may indicate danger. For example, the computing device 202 can be configured to detect whether a passenger rest compartment temperature is above or below a predetermined critical (e.g., maximum/minimum operating) temperature based on one or more measurements or thermal images generated by a respective infrared sensor/camera 222 of the passenger rest compartment 128. The computing device 202 can be configured to provide an audible alert (e.g., alarm/chime via the speaker 216) and/or a visual alert (e.g., via the display 214 or light system 218) via the flight attendant information system 210 to indicate a critical status (e.g., perceived danger or situation warranting action by one or more flight attendants) of the passenger rest compartment 128 when the passenger rest compartment temperature is above a predetermined (maximum) critical temperature, or similarly if the passenger rest compartment temperature is below a predetermined (minimum) critical temperature.

In an example embodiment, the computing device 202 is configured to detect a temperature of a portion of (e.g., (e.g., a specific location/area within) passenger rest compartment or common area (e.g., vestibule 114 or corridor of the passenger rest cabin 102/104) based on one or more thermal images generated by a respective infrared sensor/camera 222 of the passenger rest compartment 128. The computing device 202 can be further configured to compare the temperature of the portion of the passenger rest compartment 128 (or passenger rest cabin 102/104 common area) with a predetermined critical temperature. For example, in some embodiments, the predetermined critical temperature is associated with the runaway temperature for an energy storage device (e.g., 260° F. for a lithium battery). In this regard, the predetermined critical temperature can be the runaway temperature or a temperature (e.g., 200° F., 210° F., 220° F., 230° F., 240° F., 250° F., or the like) that is below the runaway temperature but indicative of potential approach to the runaway temperature. In other embodiments, the predetermined critical temperature may be associated with a combustion temperature, fire (e.g., in the range of 500° F. to 1500° F.), excessive radiation, or the like. The computing device 202 can be configured to provide an audible alert (e.g., alarm/chime via the speaker 216) and/or a visual alert (e.g., via the display 214 or light system 218) via the flight attendant information system 210 to indicate a critical status of the passenger rest compartment 128 when the detected temperature of the portion of the passenger rest compartment 128 (or passenger rest cabin 102/104 common area) is above the predetermined critical temperature. The computing device 202 may be further configured to display the location of the portion of the passenger rest compartment via at least one display 214 of the flight attendant information system 210 when the temperature of the portion of the passenger rest compartment 128 (or passenger rest cabin 102/104 common area) is above the predetermined critical temperature. This can help flight attendants/cabin crew determine the best approach to handling the critical situation (e.g., by evacuating passengers, firefighting, etc.). Furthermore, the computing device 202 can be configured to help in early fire detection/prediction (e.g., by detecting or predicting the presence of a fire before a smoke detector or ambient heat sensor would be capable of doing so) in the passenger rest compartment 128 or common area of the passenger rest cabin 102/104. In some embodiments, the computing device 202 is configured to display to provide a fire prediction alert (e.g., an audible alert (e.g., alarm/chime via the speaker 216) and/or a visual alert (e.g., via the display 214 or light system 218) via the flight attendant information system 210) based on the detected temperature of the portion of the passenger rest compartment 128 (or passenger rest cabin 102/104 common area) and the location of the portion of the passenger rest compartment 128 (or passenger rest cabin 102/104 common area). The computing device 202 may also have emergency/crisis guidance instructions, escape routes, and/or other emergency guidance information in the storage 208. The computing device 202 may be configured to display emergency guidance information via at least one display 214 of the flight attendant information system 210 based on the detected temperature of the portion of the passenger rest compartment 128 (or passenger rest cabin 102/104 common area) and the location of the portion of the passenger rest compartment 128 (or passenger rest cabin 102/104 common area) where the critical temperature is detected.

In some embodiments, the computing device 202 can be configured to detect whether a change (increase/decrease) in temperature of a passenger rest compartment 128 is above or below a predetermined critical change in temperature based on a plurality of measurements or thermal images generated by a respective infrared sensor/camera 222 of the passenger rest compartment 128. The computing device 202 can be configured to provide an audible alert (e.g., alarm/chime via the speaker 216) and/or a visual alert (e.g., via the display 214 or light system 218) via the flight attendant information system 210 to indicate a critical status (e.g., perceived danger or situation warranting action by one or more flight attendants) of the passenger rest compartment 128 when the change in temperature is exceeds the predetermined critical change in temperature (e.g., when the temperature increases or decreases by more than N degrees, or too quickly (e.g., more an N degrees/t seconds)).

The passenger rest cabin monitoring system 200 may further include visual cameras 224 (e.g., cameras 180 that detect light in the visible illumination spectrum (e.g., 400 nm-700 nm)) disposed in the passenger rest compartments 128, the vestibule 114, or other portions (e.g., corridor) of the passenger rest cabin 102/104. In some embodiments, the visual cameras 224 are only employed in the common areas (e.g., vestibule 114 and corridor of a passenger rest cabin 102/104). In other embodiments, visual cameras 224 are also installed in each of the passenger rest compartments 128. The computing device 202 can be communicatively coupled to the visual cameras 224 and configured to record one or more images of a passenger rest compartment 128 (or passenger rest cabin 102/104 common area) with a respective visual camera 224. In some embodiments, to avoid intruding upon a passenger's privacy, the visual cameras 224 can be selectively enabled to record images (e.g., during takeoff/landing to make sure no passengers are in the rest cabin 102/104, when danger/critical events are detected, and the like). For example, the computing device 202 may detect a critical status (e.g., excessive heat, unauthorized occupancy of a passenger rest compartment, etc.) of the passenger rest compartment based on one or more measurements or thermal images generated by a respective infrared sensor/ camera 222 of the passenger rest compartment 128, and can be configured to record one or more images of the passenger rest compartment 128 with a respective visual camera 224 of the passenger compartment 128 when the critical status is detected. The computing device 202 can also be configured to cause the flight attendant information system 210 to display the recorded images of the passenger rest compartment 128 via the display (or displays) 214 (e.g., displays 184) of the flight attendant information system 210.

In some embodiments, the computing device 202 is further configured to detect whether a passenger activity state (e.g., movement) is above or below a predetermined critical activity state based on one or more thermal images generated by a respective infrared sensor/camera 222 of the passenger rest compartment 128 (or passenger rest cabin 102/104 common area) or one or more images of the passenger rest compartment 128 recorded by a respective visual camera 224 of the passenger rest compartment 128 (or passenger rest cabin 102/104 common area). The computing device 202 may be configured to detect one or more passenger gestures based on one or more images recorded by a respective visual camera 224 of the passenger rest compartment 128 (or passenger rest cabin 102/104 common area). In some embodiments, the computing device 202 includes a plurality of critical passenger gestures that may indicate a crisis or other situation requiring flight attendant intervention in a database in the storage 208. The computing device 202 may be configured to detect a critical passenger gesture based on the one or more images recorded by the respective visual camera 224 and provide an audible alert (e.g., alarm/chime via the speaker 216) and/or a visual alert (e.g., via the display 214 or light system 218) via the flight attendant information system 210 to indicate a critical passenger status when the one or more passenger gestures correspond to one or more predetermined critical passenger gestures (e.g., rapid/frantic movement, seizing, waving/flailing of arms, punching, kicking, etc.).

In some embodiments, the computing device 202 can also be configured to detect one or more passenger facial expressions based on one or more images recorded by a respective visual camera 224. The computing device 202 may include a plurality of critical passenger facial expressions that may indicate a crisis or other situation requiring flight attendant intervention in a database in the storage 208. The computing device 202 can be configured to detect a critical passenger facial expression based on the one or more images recorded by the respective visual camera 224 and provide an audible alert (e.g., alarm/chime via the speaker 216) and/or a visual alert (e.g., via the display 214 or light system 218) via the flight attendant information system 210 to indicate a critical passenger status when the one or more passenger gestures correspond to one or more predetermined critical passenger facial expressions (e.g., choking, gagging, excessive coughing or apparent discomfort, anger, etc.).

The presence of an individual in a passenger rest compartment 128 and/or motion can additionally/alternatively be detected by one or more force sensors 234 (e.g., force sensor 178) in a passenger rest compartment 128 (e.g., integrated within the bed 129). The computing device 202 can be configured to provide an audible alert (e.g., alarm/chime via the speaker 216) and/or a visual alert (e.g., via the display 214 or light system 218) via the flight attendant information system 210 to indicate a critical activity state (e.g., little to no movement or overactive passenger) within the passenger rest compartment 128 when the detected passenger activity state is above the predetermined critical activity state.

The computing device 202 can also be configured to monitor sound/noise levels in the passenger rest compartments 128. The passenger rest compartments 128 or other portions (e.g., corridor) of the passenger rest cabin 102/104 can include microphones 230 for monitoring sound/noise levels. In some embodiments, a microphone 230 (e.g., microphone 162) is part of a PSU 226 (e.g., PSU 148) in the passenger rest compartment 128. In other embodiments, the microphone 230 is dedicated to sound/noise level monitoring, for example, a camera 222/224 may be equipped with or proximate to the microphone 230. The computing device 202 may be configured to detect a critical status (e.g., perceived danger or situation warranting action by one or more flight attendants) of a passenger rest compartment 128 when the passenger rest compartment sound/noise level detected by a respective microphone 230 of the passenger rest compartment 128 exceeds a predetermined critical noise level. In some embodiments, the computing device 202 can be configured to record one or more images of the passenger rest compartment 128 with a respective visual camera 224 of the passenger compartment 128 when the critical status is detected, and can be further configured to display the recorded images of the passenger rest compartment 128 via at least one display 214 (e.g., display 184) of the flight attendant information system 210. The computing device 202 may additionally/alternatively be configured to provide an audible alert (e.g., alarm/chime via the speaker 216) and/or a visual alert (e.g., via the display 214 or light system 218) via the flight attendant information system 210 to indicate a critical status (e.g., perceived danger or situation warranting action by one or more flight attendants) of the passenger rest compartment 128 when the passenger rest compartment noise level exceeds the predetermined critical noise level.

The passenger rest cabin monitoring system 200 can further include at least one hazard detector 228 (e.g., hazard detector 182) in respective ones of the passenger rest compartments 128 or in another portion (e.g., corridor) of the passenger rest cabin 102/104. For example, the hazard detector 228 can include, but is not limited to, a smoke detector, a carbon monoxide detector, a radiation detector, an electric field detector, a magnetic field detector, or any combination thereof. In some embodiments, one or more hazard detectors 228 and/or alarms are part of the primary aircraft system, and the passenger rest cabin monitoring system 200 can be configured to access these detectors 228 and/or alarms. In other embodiments, the passenger rest cabin monitoring system 200 includes hazard detectors 228 and/or alarms that are separate from or added on to/integrated with the primary aircraft system components.

The computing device 202 can be in communication with the hazard detector 228 (or multiple hazard detectors 228) and configured to detect a critical status (e.g., perceived danger or situation warranting action by one or more flight attendants) when a hazard is detected by a respective hazard detector 228 of a passenger rest compartment 128 or common area of the passenger rest cabin 102/104. The computing device 202 can be configured to provide an audible alert (e.g., alarm/chime via the speaker 216) and/or a visual alert (e.g., via the display 214 or light system 218) via the flight attendant information system 210 to indicate a critical status (e.g., perceived danger or situation warranting action by one or more flight attendants) of the passenger rest compartment 128 when a hazard is detected. In some embodiments, a visual camera 224 may be in proximity to (e.g., in the same general location/zone) as a respective hazard detector 228, and the computing device 202 can be configured to record one or more images with the visual camera 224 when the hazard/critical status is detected by the hazard detector 228. The computing device 202 may be further configured to display the recorded images via one or more displays 214 of the flight attendant information system 210.

Figure 7B:
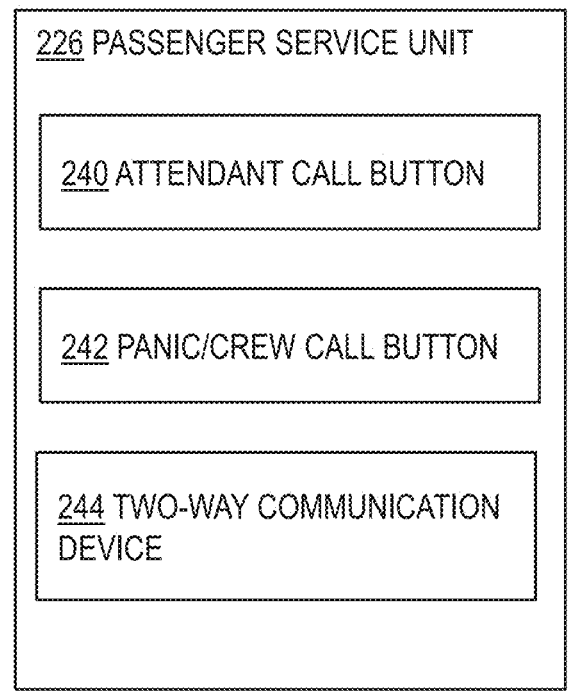
FIG. 7B is a block diagram of a passenger service unit that can be employed in conjunction with the passenger rest cabin monitoring system of FIG. 7A for a passenger aircraft, such as the passenger aircraft illustrated by any of FIGS. 1 through 6B or any combination thereof, in accordance with an example embodiment of this disclosure.

The passenger rest cabin monitoring system 200 includes or is connected with PSUs 226 (e.g., PSUs 148) in the passenger rest compartments 128. As shown in FIG. 7B, each PSU 226 may include an attendant call button 240 (e.g., attendant call button 164), a panic/crew call button 242 (e.g., panic/crew call button 158), and a two-way communication device 244 (e.g., speaker/microphone 162) that are communicatively coupled to the computing device 202. The computing device 202 may be configured to receive a passenger communication or alert from a respective PSU 226 of a passenger rest compartment 128 and configured to provide an audible alert (e.g., alarm/chime via the speaker 216) and/or a visual alert (e.g., via the display 214 or light system 218) via the flight attendant information system 210 to indicate that a passenger communication or alert has been received from the passenger rest compartment 128. A flight attendant may then respond to alert and/or communicate with the passenger using a communication device 220 (e.g., communication device 190) of the flight attendant information system 210. For example, the flight attendant communication device 220 and the passenger communication device 244 may be configured to communicate (privately) over a dedicated communication channel. In embodiments, each passenger rest compartment 128 is equipped with a passenger communication device 244 that can be used for private communications with the flight attendants/flight crew (e.g., via communication with the flight attendant communication device 220).

In embodiments, the computing device 202 is further configured to communicate safety belt statuses to the flight attendant information system 210 based on information received from safety belt monitors 232 (e.g., safety belt monitors 137), which may be integrated within the buckles or elsewhere for safety belts 136 in the passenger rest compartments 128. The computing device 202 may be configured to receive a safety belt status (e.g., buckled/unbuckled or secured/unsecured status) from a safety belt monitor 232 of a respective passenger rest compartment 128. When it required that safety belts are worn (and buckled/secured), the computing device 202 can be configured to provide an audible alert (e.g., alarm/chime via the speaker 216) and/or a visual alert (e.g., via the display 214 or light system 218) via the flight attendant information system 210 to notify flight attendants that a safety belt 136 is unbuckled/unsecured in an occupied passenger rest compartment 128.

As discussed above, in some embodiments, virtual windows 236 and/or inflight entertainment display devices are located in the passenger rest compartments 128. The computing device 202 may be configured to activate a respective virtual window 236 of the passenger rest compartment 128 based on the detected presence of the individual in the passenger rest compartment 128, for example, based on one or more measurements or thermal images generated by a respective infrared sensor/camera 222 of the passenger rest compartment 128, and/or based on weight/movement measurements detected by a respective force sensor 234 of the passenger rest compartment 128. In embodiments, the computing device 202 and/or the virtual window 236 can be implemented and configured as described in U.S. patent application Ser. No. 16/126,952, filed Sep. 10, 2018, which is incorporated herein by reference in its entirety.

In embodiments, the passenger rest cabin monitoring system 200 may further include or can be configured to communication with the flight attendant/cabin crew's portable electronic devices 238 (e.g., smartphones, tablets, wearables (e.g., activity trackers, pendants, smart watches). In this regard, any of the audible or visual alerts output via the flight attendant information system 210 may be additionally or alternatively provided via at least one portable electronic device 238. Furthermore, a flight attendant may employ his/her portable electronic device 238 instead of or in addition to the communication device 220 for two-way (private) communications with PSUs 226 of the passenger rest compartments 128 and/or to broadcast messages or information (e.g., via the aircraft speaker system).

Because of privacy concerns, one or more aspects of the passenger cabin monitoring system 200 described herein can be selectively enabled/disabled. In some implementations, the computing device 202 is configured to receive "opt in" or "opt out" requests for passengers (e.g., via the passenger's PSU 226 or via a flight attendant input to the flight attendant information system 210). The requests can be for selectively disabling some or all of the monitoring equipment in a particular passenger rest cabin 128. In some embodiments, some of the monitoring equipment (e.g., the infrared camera/sensor 222, hazard detector 228, safety belt monitor 232, and/or other equipment that does not intrude on the passenger's privacy) cannot be disabled, while other monitoring equipment (e.g., visual camera 224, microphone 230, force sensor 234, and/or other equipment that may intrude on the passenger's privacy) can be disabled.

As used throughout and as would be appreciated by those skilled in the art, "at least one non-transitory computer-readable medium" may refer to as at least one non-transitory computer-readable medium (e.g., memory 206, storage 208 or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for monitoring passenger rest compartments, comprising:
   a vestibule disposed in a passenger cabin of an aircraft, the vestibule including at least one staircase for accessing a passenger rest cabin above or below the passenger cabin of the aircraft;
   a plurality of passenger rest compartments in the passenger rest cabin, the passenger rest compartments including beds, infrared cameras, virtual windows, and passenger service units;
   a flight attendant information system including at least one display and at least one speaker;
   a computing device in communication with the infrared cameras, the passenger service units, and the flight attendant information system, the computing device configured to:
   detect a temperature of a portion of passenger rest compartment based on one or more thermal images generated by a respective infrared camera of the passenger rest compartment;
   compare the temperature of the portion of the passenger rest compartment with a predetermined critical temperature; and
   activate a respective virtual window of the passenger rest compartment based on a detected presence of the individual in the passenger rest compartment; and
   provide at least one of an audible alert or a visual alert via the flight attendant information system to indicate a critical status of the passenger rest compartment when the temperature of the portion of the passenger rest compartment is above the predetermined critical temperature.

2. The system of claim 1, wherein the computing device is further configured to:
   display the location of the portion of the passenger rest compartment via the at least one display of the flight attendant information system when the temperature of the portion of the passenger rest compartment is above the predetermined critical temperature.

3. The system of claim 2, wherein the computing device is further configured to:
   display a fire prediction alert via the at least one display of the flight attendant information system based on the detected temperature of the portion of the passenger rest compartment and the location of the portion of the passenger rest compartment.

4. The system of claim 2, wherein the computing device is further configured to:
   display emergency guidance information via the at least one display of the flight attendant information system based on the detected temperature of the portion of the passenger rest compartment and the location of the portion of the passenger rest compartment.

5. The system of claim 1, wherein the predetermined critical temperature is associated with a runaway temperature of an energy storage device.

6. The system of claim 1, wherein the computing device is further configured to:
   detect a presence of an individual in a passenger rest compartment based on one or more thermal images generated by a respective infrared camera of the passenger rest compartment; and
   display an indication of the presence of the individual in the passenger rest compartment via the at least one display of the flight attendant information system.

7. The system of claim 1, further comprising a plurality of visual cameras disposed in respective portions of the vestibule, a corridor of the passenger cabin, and respective ones of the passenger rest compartments.

8. The system of claim 7, wherein the computing device is further configured to:
   detect whether a passenger activity state is above or below a predetermined critical activity state based on one or more images recorded by a respective one of the plurality of visual cameras; and
   provide at least one of an audible alert or a visual alert via the flight attendant information system to indicate a critical activity state when the passenger activity state is above the predetermined critical activity state.

9. The system of claim 7, wherein the computing device is further configured to:
   detect one or more passenger gestures based on one or more images recorded by a respective one of the plurality of visual cameras; and
   provide at least one of an audible alert or a visual alert via the flight attendant information system to indicate a critical passenger status when the one or more passenger gestures correspond to one or more predetermined critical passenger gestures.

10. The system of claim 7, wherein the computing device is further configured to:
    detect one or more passenger facial expressions based on one or more images recorded by a respective one of the plurality of visual cameras; and
    provide at least one of an audible alert or a visual alert via the flight attendant information system to indicate a critical passenger status when the one or more facial expressions correspond to one or more predetermined critical passenger facial expressions.

11. The system of claim 7, wherein the computing device is further configured to:
    detect a critical status of the passenger rest compartment based on the one or more thermal images generated by the respective infrared camera of the passenger rest compartment;
    record one or more images of the passenger rest compartment with a respective visual camera of the passenger compartment when the critical status is detected; and
    display the one or more images of the passenger rest compartment via the at least one display of the flight attendant information system.

12. The system of claim 1, further comprising additional infrared cameras disposed in respective portions of the vestibule and the corridor of the passenger cabin, wherein the computing device is further configured to:
    detect a temperature of a portion of the vestibule or the corridor based on one or more thermal images generated by a respective one of the additional infrared cameras;
    compare the temperature of the portion of the vestibule or the corridor with a predetermined critical temperature; and provide at least one of an audible alert or a visual alert via the flight attendant information system to indicate a critical status of the passenger rest compartment when the temperature of the portion of the passenger rest compartment is above the predetermined critical temperature.

13. The system of claim 1, wherein the passenger rest compartments further include microphones, wherein the computing device is further configured to:

detect a critical status of the passenger rest compartment when a passenger rest compartment noise level detected by a respective microphone of the passenger rest compartment exceeds a predetermined critical noise level; and provide at least one of an audible alert or a visual alert via the flight attendant information system to indicate the critical status of the passenger rest compartment when the passenger rest compartment noise level exceeds the predetermined critical noise level.

14. The system of claim 1, further comprising at least one hazard detector and at least one visual camera in proximity to the at least one hazard detector, wherein the computing device is further configured to:

record one or more images with the at least one visual camera when the critical status is detected; and display the one or more images via the at least one display of the flight attendant information system.

15. The system of claim 14, wherein the at least one hazard detector comprises at least one of a smoke detector, a carbon monoxide detector, a radiation detector, an electric field detector, or a magnetic field detector.

16. The system of claim 1, wherein the computing device is further configured to:

receive a passenger communication or alert from a respective passenger service unit of the passenger rest compartment; and provide at least one of an audible alert or a visual alert via the flight attendant information system to indicate the passenger communication or alert has been received from the passenger rest compartment.

17. The system of claim 16, wherein the passenger service unit includes an attendant call button, a panic button, and a two-way communication device facilitating a private communication channel between the flight attendant information system and the passenger service unit.

18. The system of claim 1, wherein the passenger rest compartments further include safety belts with safety belt monitors configured to detect buckled or unbuckled statuses of respective safety belts, wherein the computing device is further configured to:

receive a safety belt status from a safety belt monitor of a respective passenger rest compartment; and provide at least one of an audible alert or a visual alert via the flight attendant information system when the safety belt status is an unbuckled status and a buckled status is required.

* * * * *